Jan. 12, 1971  E. W. HENDERSON  3,554,706
CARBON BLACK FURNACE
Filed May 26, 1969
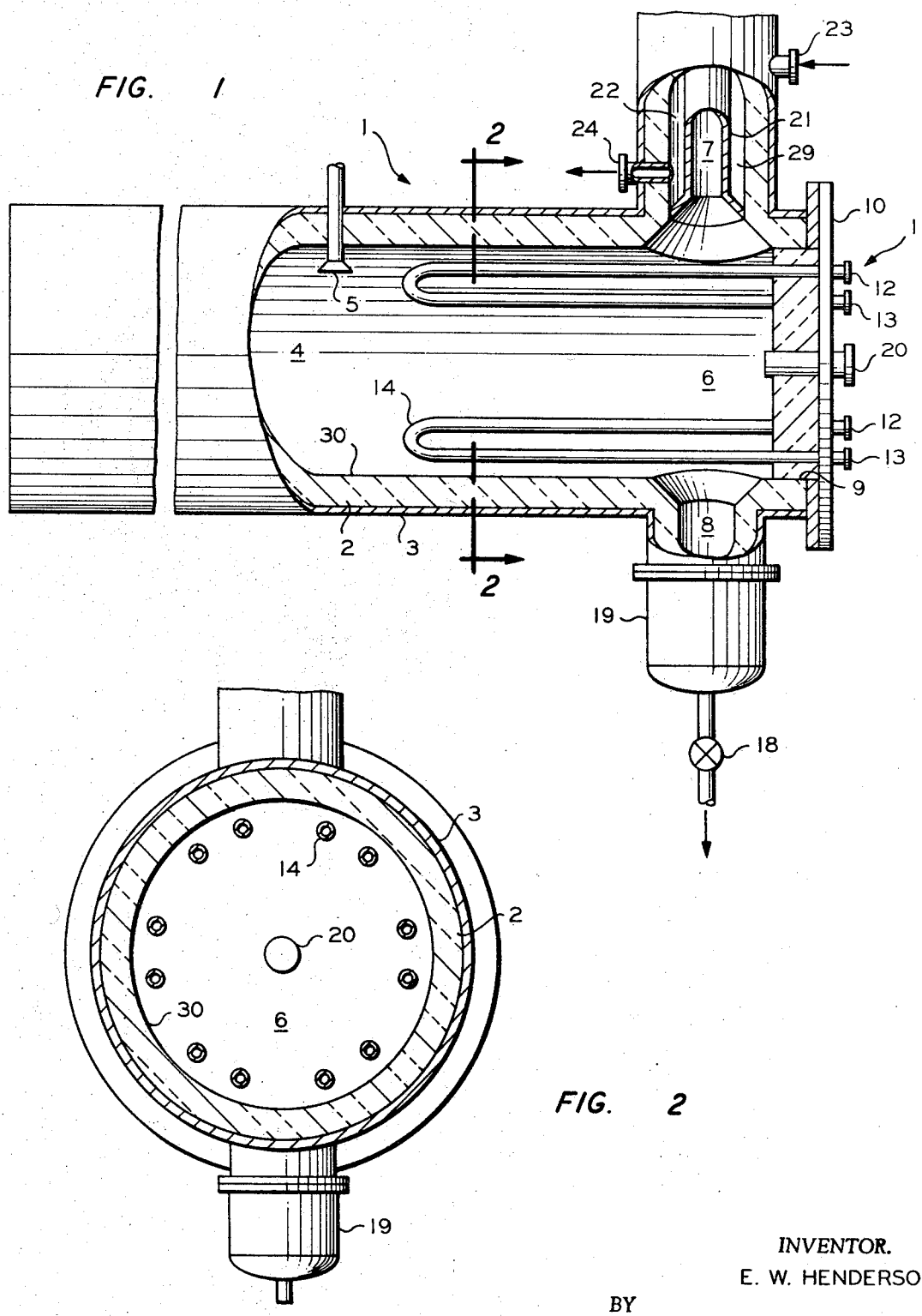
INVENTOR.
E. W. HENDERSON
BY
ATTORNEYS United States Patent Office 3,554,706
Patented Jan. 12, 1971

3,554,706
CARBON BLACK FURNACE
Eulas W. Henderson, Bartlesville, Okla., assignor to Phillips Petroleum Company, a corporation of Delaware
Filed Mar. 26, 1969, Ser. No. 810,849
Int. Cl. C09c 1/58
U.S. Cl. 23—259.5
7 Claims

ABSTRACT OF THE DISCLOSURE

Reactor apparatus for the production of carbon black having a downward-extending outlet conduit positioned downstream of the quench system to facilitate removal of unvaporized quenching medium, and an upwardly-extending conduit for smoke removal, heat exchanger means being positioned therebetween.

This invention pertains to carbon black production.

In one of its more specific aspects, this invention relates to apparatus for production of carbon black.

In furnace processes for the production of carbon black, it is conventional to terminate the reaction by quenching the smoke in the downstream portion of the reactor and to then conduct the cooled smoke from the reactor to carbon black recovery.

Quenching with water reduces the temperature of the smoke to about 600° F. but increases its water content. Since not all the quench water is vaporized immediately upon its introduction into the smoke, and since the temperature of the smoke is not immediately reduced, that portion of the system immediately following the quench is subjected to considerable temperature variation with the result that differential expansion and leakage of the equipment result. This occurs even though the duct work may be constructed of austenitic stainless steel.

While efforts have been made to establish improved quench spray patterns and improved materials of construction, such efforts have not been entirely successful in alleviating the problems.

Now, however, a novel apparatus has been invented which has alleviated the aforementioned difficulties. According to this invention there is provided a carbon black reactor having a downwardly discharging conduit adapted for entrapment of liquid from the smoke, an outlet from the trap for removing the liquid, a smoke outlet from the reactor, and heat exchanger means extending between the trap and the smoke outlet to facilitate cooling of the smoke and disentrainment of water vapor therefrom.

In one of its embodiments, a sight glass is provided for observational purposes.

In still another embodiment, cooling means are positioned in the smoke outlet from the reactor to effect further cooling of the smoke and disentrainment of moisture therefrom, the liquid being removed through the entrapping conduit.

The apparatus of this invention will be more easily understood if explained in reference to the attached drawings which show, in FIG. 1, a view in elevation of one embodiment of the aparatus of this invention and in FIG. 2, a cross sectional elevation view of the same embodiment.

Referring now to FIG. 1, there is shown reactor 1 of any of the conventional configurations, reactant stream introductory lines and the like not being shown. The reactor is internally insulated with insulation 2 inside shell 3 to form a reaction zone 4 having inside wall 30. One or more quench nozzles, of which nozzle 5 is typical, are provided and communicate with reaction zone 4.

Located downstream of nozzle 5 is a vertically upward extending conduit 7 and a downward extending conduit 8. Reaction zone 4 is closed in its downstream longitudinal direction by manhole 9 having cover plate 10.

Outlet 7 is insulated and conducts the cooled smoke from the reactor to subsequent separation facilities. Outlet 8 serves to entrap that unvaporized medium used for quenching or for removal of that liquid disentrained as hereinafter explained. Preferably, conduits 7 and 8 will be positioned on the same vertical center line.

Cover plate 10 is preferably insulated and this insulation provides a collision surface for the smoke as it changes its direction of travel from the horizontal to the vertical. As a result of such collision, entrained moisture separates from the smoke and gravitates into outlet 8 from which it can be removed through valve 18. Outlet 8 is preferably insulated in its upper region and formed with a separable section 19 in its lower region to permit replacement as necessary due to corrosion by the collected liquid.

Extending through cover plate 10 of manhole 9 is heat exchanger 11 which can comprise a single exchanger or a plurality of exchangers. Through this exchanger means 11 there is caused to flow some material which further cools the smoke and the vaporized quench it may contain, thus aiding in the disentrainment of nonvaporized quench at this point and its removal through outlet 8.

This heat exchanger 11 can be any conventional type, such as for example, a system of U-tubes, a system of bayonet tubes, or a helical coil. For illustrative purposes it is here indicated as a system of U-tubes 14 having inlet headers 13 and outlet headers 12. Inlet headers 13 and outlet headers 12 can be positioned proximate each other or inlet header 13 may be located proximate cover plate 10, outlet header 12 being positioned upstream therefrom, the exchanger tubes existing from the reaction zone through the side walls of the reactor, not shown. In the former instance, U-tubes 14 will be removable from the reactor, as a unit, through manhole 9. In the latter instance, provision can be made for slip-joint type construction to allow the removal of cover plate 10 from manhole 9.

Through cover plate 10 is positioned sight glass 20 by means of which visual inspection of the interior of the reactor can be made. To facilitate this inspection, the tubes of the exchanger 11 can be arranged around the inner periphery of reaction zone 4, leaving a tunnel down through which glass 20 is sighted.

Positioned peripheral of outlet 7 is exchanger 29 having walls 21 enclosing zone 22 through which further heat exchange of the hot smoke can be made in the vertical outlet. While heat exchanger 29 can be of any suitable design which does not obstruct flow from the reactor, it is preferably formed as an integral portion of conduit 7, where it is nonobstructive. Preferably, wall 21 is made of a high conductivity, high corrosion resistant material. That material flowing through zone 22 enters through nozzle 23 and leaves through nozzle 24, there thus being formed a heat exchanger peripheral to outlet 7. Upon passage through heat exchanger 29, cooling of the smoke takes place. While exchanger 29 has been shown in a specific embodiment, as in the case of exchanger 11, it may be of any convenient type and configuration.

In FIG. 2 is seen the apparatus of this invention in cross-sectional elevation along 2—2 of FIG. 1, sight glass 20 allowing sighting through zone 6 between U-tubes 14 into zone 4.

The apparatus of this invention has been successful in elimination of principal problems of corrosion downstream of the smoke quench point in the conventionally operated carbon black furnace.

The embodiment discussed above lends itself to suggested modifications such as heat exchanger design, sight glass positioning and the like. However, such are considered to be within the scope of the invention.

What is claimed is:

1. In a carbon black reactor adapted for introduction of reactants proximate one extremity of its horizontally-positioned reaction zone and having quenching means positioned in the downstream portion of its reaction zone, the improvement comprising:
 (a) a conduit positioned downstream of said quenching means and extending downwardly from, and in open communication with said reaction zone, said conduit being adapted with closure means;
 (b) a conduit positioned downstream of said quenching means and extending upwardly from and in open communication with said reaction zone;
 (c) closure means positioned terminally of said reaction zone;
 (d) heat transfer means projecting through said closure means and interposed between said upwardly extending conduit and said downwardly extending conduit.

2. The apparatus as defined in claim 1 in which said heat transfer means comprises a system of interconnected U-tubes positioned peripheral to the inner wall of the reaction zone.

3. The apparatus as defined in claim 1 in which said heat transfer means comprises a helical coil positioned peripheral to the inner wall of the reaction zone.

4. The apparatus as defined in claim 1 in which heat transfer means is positioned in said upwardly extending conduit.

5. The apparatus as defined in claim 1 in which said closure means is adapted with viewing means.

6. The apparatus as defined in claim 1 in which said downwardly extending conduit and said upwardly extending conduit are positioned on the same vertical center line.

7. The apparatus as defined in claim 1 in which said heat transfer means comprises a system of interconnectedly heat transfer elements positioned peripheral to the inner wall of the reaction zone and said upwardly extending conduit has heat transfer means positioned therein, said upwardly extending conduit and said downwardly extending conduit being positioned on the same vertical center line, said closure means positioned terminally of said reaction zone being adapted with a sight glass.

References Cited
UNITED STATES PATENTS

| | | | |
|---|---|---|---|
| 3,327,456 | 6/1967 | Guber, Jr., et al. | 55—269 |
| 3,369,870 | 2/1968 | Ganz et al. | 23—209.4 |
| 3,470,678 | 10/1969 | Clark et al. | 55—269 |

JAMES H. TAYMAN, JR., Primary Examiner

U.S. Cl. X.R.

23—209.4, 209.8; 165—1, 74; 110—119; 261—17, 152; 55—269, 257